F. DE F. ROSS.
CAR PLATFORM.
APPLICATION FILED FEB. 12, 1915.
1,148,932.
Patented Aug. 3, 1915.
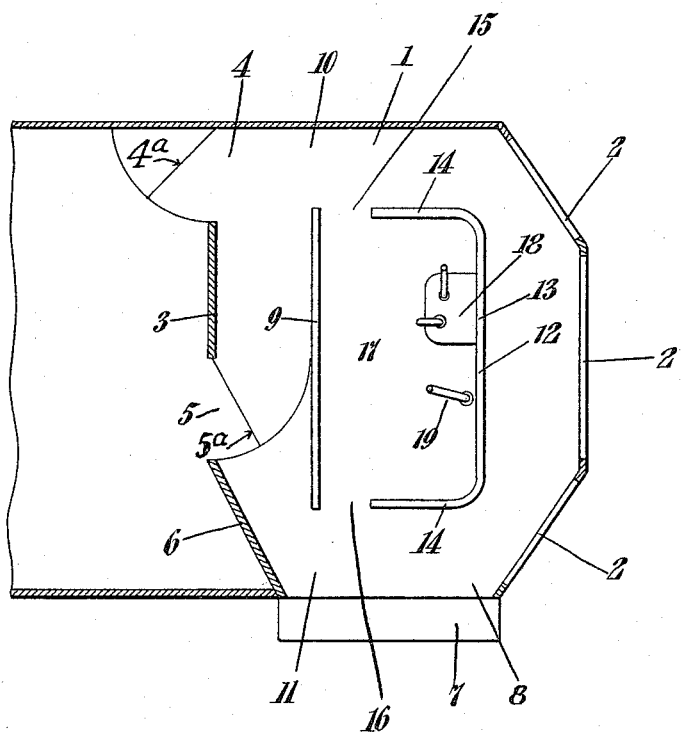
WITNESSES
INVENTOR
Frank De F. Ross
BY
ATTORNEYS

UNITED STATES PATENT OFFICE.

FRANK DE F. ROSS, OF WEST ORANGE, NEW JERSEY.

CAR-PLATFORM.

1,148,932.  Specification of Letters Patent.  Patented Aug. 3, 1915.

Application filed February 12, 1915. Serial No. 7,665.

*To all whom it may concern:*

Be it known that I, FRANK DE F. ROSS, of West Orange, in the county of Essex and State of New Jersey, have invented a certain new and useful Improvement in Car-Platforms, and do hereby declare that the following is a full, clear, and exact description thereof.

My invention relates particularly to the platforms of vehicles adapted to convey a number of people, as for example, street cars, motor buses, etc.

The object of my invention is to provide a car platform of this character which is especially adapted for operation so that the motorman may also act as the conductor. It is to be understood, however, that my invention is also applicable to vehicles of this type, which are operated in such a manner as to have both a motorman and a conductor on the same vehicle.

A further object of my invention is to so arrange the platform as to make the operation of the car more convenient.

Another object of my invention is to arrange the parts in such a manner that a passageway is provided for the entrance and exit of the passengers, free from the controlling apparatus, such as the brake, etc., thereby avoiding the inconvenience of passengers where the controlling apparatus is located in the passageways.

Further objects of my invention will appear from a detailed description thereof appearing hereinafter.

While my invention is capable of embodiment in many different forms, for the purpose of illustration I shall show only one form thereof in the accompanying drawings in which the figure is a plan of a car platform made in accordance with my invention.

In the drawings I have shown a car platform 1, attached to any suitable type of car or motor bus, and located either at the front or rear end, or both the front and rear end thereof. At the front of the platform 1 there are preferably provided three windows 2, and at the rear of the platform there is provided the partition 3 having one doorway 4 provided with a door 4ª adjacent to one of the side walls of the car, and another doorway 5 provided with a door 5ª located nearer the other side wall of the car. A portion 6 of the wall 3 located between the doorway 5 and the adjacent side wall of the car is inclined to guide the passengers from the doorway 5 to a step 7 located at one side of the car and communicating with a doorway 8 adjacent to the step 7.

Preferably the doorway 4 serves as the entrance and the doorway 5 as the exit for the passengers.

On the platform 1 there is a railing or low partition 9 extending crosswise of the platform, but leaving openings 10 and 11 between its ends and the side walls of the car. In front of the railing or low partition 9 there is a U-shaped railing or partition 12 having a transverse portion 13 and two longitudinal portions 14, which latter portions extend toward the ends of the railing or partition 9 but leave openings 15 and 16 between the same for the passage, when desired, of the motorman, conductor, or even passengers. The railings or low partitions 12 and 9 provide a small cab or space 17 to accommodate the motorman, or the motorman and conductor, and in this space 17 there is located a controller 18 and a brake lever 19 to control the operation of the vehicle.

In the operation of my invention, assuming that the car or motor bus is operated merely by one employee, who is to act both as motorman and conductor, the passages are so arranged that the passengers must pass in front of the motorman in the passageway located in front of the railing or low partition 12 so that the fares may be readily collected by him before the passengers leave the platform to pass into the interior of the car. Owing to the location of the motorman he may furthermore control the exit of passengers from the car without leaving his position. In fact, if so desired, the car may be operated as a pay-as-you-leave car, instead of a pay-as-you-enter car. In case of an emergency and where it is found desirable, the passageway located between the railing or low partition 9 and the partition 3 may be used either for the entrance or the exit of passengers. For example, if the passageway in front of the motorman should become blocked, as in the case of an unusual crowd, the passageway at the rear of the platform could be used either for the entrance or exit of passengers through the same from either one or both of the doors 4 and 5, as desired. Similarly, it might be found desirable to have the passengers enter the door 5 through the passageway at the rear of the motorman, and leave the car by the door 4 through the passageway in front of the motorman, thus reversing the mode of operation previously described. This will be entirely within the control of the motorman.

It is to be understood, however, that my invention may be operated with a motorman and a conductor both at one end of the car, or located at different ends of the car. It is also to be understood that my invention may be used with any of the numerous other controlling devices which are at times found located upon cars or car platforms for the control of the same. It is also to be understood that the interior of the car may be constructed and arranged in any desired manner.

While I have described my invention above in detail, I wish it to be understood that many changes may be made therein without departing from the spirit of my invention.

I claim:

1. A vehicle platform having a space for the motorman near the end of the car, a passageway for the passengers passing between said space and said end of the car, and another passageway on the other side of the motorman's space.

2. A vehicle platform having a space for the motorman near the end of the car, a passageway for the passengers passing between said space and said end of the car, and another passageway on the other side of the motorman's space, the said space being separated from the said passageways by railings.

3. A vehicle platform having a space for the motorman near the end of the car, a passageway for the passengers passing between said space and said end of the car, and a partition at the rear of the platform and at the rear of the motorman's space having a door giving access from the interior of the car to said passageway.

4. A vehicle platform having a space for the motorman near the end of the car, a passageway for the passengers passing between said space and said end of the car, another passageway on the other side of the motorman's space, and a partition at the rear of the platform having a door giving access to the first mentioned passageway.

5. A vehicle platform having a space for the motorman near the end of the car, a passageway for the passengers passing between said space and said end of the car, the said space being separated from the said passageway by a railing, and a partition at the rear of the platform having a door giving access to the said passageway.

6. A vehicle platform having a space for the motorman near the end of the car, a passageway for the passengers passing between said space and said end of the car, another passageway on the other side of the motorman's space, the said space being separated from the said passageways by railings, and a partition at the rear of the platform having a door giving access to the first mentioned passageway.

7. A vehicle platform having a space for the motorman near the end of the car, a passageway for the passengers passing between said space and said end of the car, and a partition at the rear of the platform having a pair of doors giving access to space in communication with the said passageway at the two sides of the space for the motorman.

8. A vehicle platform having a space for the motorman near the end of the car, a passageway for the passengers passing between said space and said end of the car, another passageway on the other side of the motorman's space, and a partition at the rear of the platform having a pair of doors giving access to space in communication with the first mentioned passageway.

9. A vehicle platform having a space for the motorman near the end of the car, a passageway for the passengers passing between said space and said end of the car, the said space being separated from the said passageway by a railing, and a partition at the rear of the platform having a pair of doors giving access to space in communication with said passageway.

10. A vehicle platform having a space for the motorman near the end of the car, a passageway for the passengers passing between said space and said end of the car, another passageway on the other side of the motorman's space, the said space being separated from the said passageways by railings, and a partition at the rear of the platform having a pair of doors giving access to space in communication with the first mentioned passageway.

11. A vehicle platform having a space for the motorman near the end of the car, a passageway for the passengers passing between said space and said end of the car, a partition at the rear of the platform having a door giving access to the said passageway, and a step leading from the said passageway to the ground.

12. A vehicle platform having a space for the motorman near the end of the car, a passageway for the passengers passing between said space and said end of the car, another passageway on the other side of the motorman's space, a partition at the rear of the platform having a door giving access to the first mentioned passageway, and a step leading from the first-mentioned passageway to the ground.

13. A vehicle platform having a space for the motorman near the end of the car, a passageway for the passengers passing between said space and said end of the car, the said space being separated from the said passageway by a railing, a partition at the rear of the platform having a door giving access to the said passageway, and a step leading from the said passageway to the ground.

14. A vehicle platform having a space for the motorman near the end of the car, a passageway for the passengers passing between said space and said end of the car, another passageway on the other side of the motorman's space, the said space being separated from the said passageways by railings, a partition at the rear of the platform having a door giving access to the first mentioned passageway, and a step leading from the first mentioned passageway to the ground.

15. A vehicle platform having a space for the motorman near the end of the car, a passageway for the passengers passing between said space and said end of the car, a partition at the rear of the platform having a pair of doors giving access to space in connection with the said passageway at the two sides of the space for the motorman, and a step leading from the said passageway to the ground.

16. A vehicle platform having a space for the motorman near the end of the car, a passageway for the passengers passing between said space and said end of the car, another passageway on the other side of the motorman's space, a partition at the rear of the platform having a pair of doors giving access to the first mentioned passageway, and a step leading from the first mentioned passageway to the ground.

17. A vehicle platform having a space for the motorman near the end of the car, a passageway for the passengers passing between said space and said end of the car, the said space being separated from the said passageway by a railing, a partition at the rear of the platform having a pair of doors giving access to space in communication with the said passageway, and a step leading from the said passageway to the ground.

18. A vehicle platform having a space for the motorman near the end of the car, a passageway for the passengers passing between said space and said end of the car, another passageway on the other side of the motorman's space, the said space being separated from the said passageways by railings, a partition at the rear of the platform having a pair of doors giving access to space in communication with the first mentioned passageway, and a step leading from the first mentioned passageway to the ground.

In testimony that I claim the foregoing I have hereunto set my hand.

FRANK DE F. ROSS.

Witnesses:
MAX SCHMITT, Jr.,
R. L. LAIRD.

Copies of this patent may be obtained for five cents each, by addressing the "Commissioner of Patents, Washington, D. C."